(12) United States Patent
Ayoub et al.

(10) Patent No.: US 12,520,349 B2
(45) Date of Patent: Jan. 6, 2026

(54) REMOTE CONTROL OF INTERNET-OF-THINGS DEVICES

(71) Applicant: THIRDWAYV, INC., Irvine, CA (US)

(72) Inventors: Michael Atef Ayoub, Irvine, CA (US); Nabil Wasily, Foothill Ranch, CA (US)

(73) Assignee: THIRDWAYV, INC., Irvine, CA (US)

( * ) Notice: Subject to any disclaimer, the term of this patent is extended or adjusted under 35 U.S.C. 154(b) by 353 days.

(21) Appl. No.: 18/039,212

(22) PCT Filed: Dec. 14, 2021

(86) PCT No.: PCT/US2021/063218
§ 371 (c)(1),
(2) Date: May 26, 2023

(87) PCT Pub. No.: WO2022/132701
PCT Pub. Date: Jun. 23, 2022

(65) Prior Publication Data
US 2024/0008102 A1    Jan. 4, 2024

Related U.S. Application Data

(60) Provisional application No. 63/125,070, filed on Dec. 14, 2020.

(51) Int. Cl.
*H04W 76/10* (2018.01)
*H04L 67/125* (2022.01)
*H04W 8/00* (2009.01)
*H04W 88/16* (2009.01)

(52) U.S. Cl.
CPC ........... *H04W 76/10* (2018.02); *H04L 67/125* (2013.01); *H04W 8/005* (2013.01); *H04W 88/16* (2013.01)

(58) Field of Classification Search
None
See application file for complete search history.

(56) References Cited

U.S. PATENT DOCUMENTS

| 9,544,813 | B2 * | 1/2017 | Wasily | H04W 88/06 |
| 10,659,442 | B1 * | 5/2020 | Huang | H04W 12/04 |
| 2004/0193695 | A1 * | 9/2004 | Salo | G06F 21/6218 709/216 |
| 2010/0235422 | A1 | 9/2010 | Perret | |

(Continued)

FOREIGN PATENT DOCUMENTS

CN    107211297 A    9/2017

OTHER PUBLICATIONS

Supplementary Partial European Search Report dated Aug. 15, 2024, in corresponding European Application No. EP21907598; 3 pages.

*Primary Examiner* — Jason D Cardone
(74) *Attorney, Agent, or Firm* — Snell & Wilmer LLP

(57) ABSTRACT

Systems, methods, and devices for remote control of IoT devices include a gateway device providing interconnection between a remote gateway device and an embedded device. The embedded device may be a device with short-range or peer-to-peer communication capabilities and the gateway device may provide interconnection of the embedded device to a communication network such as the internet. Commands may be provided remotely over the communication network to the gateway device for execution by the embedded device.

30 Claims, 9 Drawing Sheets

(56) References Cited

U.S. PATENT DOCUMENTS

| | | | |
|---|---|---|---|
| 2015/0163843 A1* | 6/2015 | Zhu | H04L 63/0869 |
| | | | 455/41.2 |
| 2016/0241660 A1 | 8/2016 | Nhu | |
| 2017/0272842 A1* | 9/2017 | Touma | A63B 24/0003 |
| 2018/0232734 A1* | 8/2018 | Smets | G06Q 20/40 |
| 2019/0080574 A1* | 3/2019 | Cai | B62B 9/00 |
| 2021/0076319 A1* | 3/2021 | Yoshikawa | H04W 40/02 |
| 2021/0100069 A1* | 4/2021 | Saldin | H04L 45/22 |
| 2021/0297842 A1* | 9/2021 | Shrivastava | H04W 28/24 |
| 2021/0360563 A1* | 11/2021 | Arrobo Vidal | H04W 60/00 |
| 2021/0400767 A1* | 12/2021 | Zubiaur | H04W 88/16 |
| 2022/0124548 A1* | 4/2022 | Srivastava | H04W 28/0268 |
| 2025/0212108 A1* | 6/2025 | Hu | H04W 4/80 |

\* cited by examiner

REMOTE CONTROL OF INTERNET-OF-THINGS DEVICES

CROSS-REFERENCE TO RELATED APPLICATIONS

This application is based upon and claims priority to U.S. provisional patent application 63/125,070 entitled "REMOTE CONTROL OF INTERNET-OF-THINGS DEVICES" and filed Dec. 14, 2020, the entire content of which is incorporated herein by reference.

BACKGROUND

1. Field

The present disclosure is directed to remote control of internet-of-things devices, and more specifically, the present disclosure is directed to remote control of internet-of-things devices via different communication channels.

2. Description of the Related Art

Internet-of-Things (IoT) systems often include an embedded device and a controller. In various instances, multiple controllers may communicate with an embedded device. Some controllers may be view-only controllers and other controllers may have authority to issue commands to the embedded device. In prior efforts, an embedded device communicated directly with a controller having command authority, and the commanding controller transmitted view-only information to the view-only controller. However, in various scenarios, a communication link between the commanding controller and the embedded device is not available. Thus, there remains a need for systems and methods for remote control of internet-of-things devices.

SUMMARY

A system, apparatus and/or method for using a mobile device as a gateway to connect with an Internet-of-Things (IoT) device or other embedded device, such as an insulin pump or device, that does not support internet connectivity is provided.

A system is provided. The system may include a gateway device and an embedded device. The gateway device may include a gateway network access device configured to use a first network protocol and a second network protocol. The gateway device may include a processor. The processor may be coupled to the gateway network access device and configured to relay communications. The embedded device may be wirelessly coupled to the gateway device. The embedded device may include a memory. The embedded device may include an embedded network access device. The embedded network access device may be configured to support peer-to-peer communication with the gateway network access device using a first network protocol. The embedded network access device may include an embedded device processor. The embedded device processor may be configured to determine that the gateway device is in a first threshold distance of the embedded device and establish a connection with a remote device via the gateway device using the first network protocol and the second network protocol.

In various embodiments, the processor of the gateway device is configured to connect with the embedded device using the first network protocol and connect with the remote device using the second network protocol, wherein the first network protocol is a short-range wireless network protocol and the second network protocol is a long-range wireless network protocol. In various embodiments, the short-range wireless network protocol is the Bluetooth Low Energy (BLE) protocol. In various embodiments, the long-range wireless network protocol is a Wi-Fi protocol or a long-term evolution (LTE) protocol. The gateway device may have a gateway device memory. The gateway device memory may be configured to store an application that facilitates the connection between the remote device and the embedded device. The gateway device processor may execute the application even when the application operates in a background environment of the gateway device or the gateway device is in a locked state.

The gateway device may include a gateway device user interface. The gateway device processor may be configured to receive status information from the remote device, receive commands from the remote device that control the embedded device, and display the status information on to the gateway device user interface. The gateway device processor may relay the commands from the remote device to the embedded device.

The gateway device processor may be configured to execute further processes. For instance, the gateway device processor may be configured to scan an environment to discover one or more embedded devices. The gateway device processor may be configured to provide the one or more embedded devices that are discovered to the remote device. The gateway device processor may further obtain a command from the remote device to connect with the one or more embedded devices that are discovered. In various embodiments, the embedded device processor of the embedded device disconnects from the gateway device when the remote device does not establish a secure communication channel within a predefined period with the gateway device.

In various embodiments, the gateway device user interface of the gateway device is configured to receive a user login and a user personal identification number (PIN). Moreover, the remote device may include a remote user interface and may be configured to receive a second user login and a second user PIN. The gateway device processor of the gateway device or a remote processor of the remote device verifies that the user login is the same as the second user login and the user PIN is the same as the second user PIN and determines that gateway device and the remote device belong to the same user.

The remote device may be a personal device. The remote device may have a memory that stores a mobile application or a cloud server that stores a cloud controller application. In various embodiments, the remote device directly connects with the gateway device when the remote device is within a second threshold distance of the gateway device. In various embodiments, the remote device connects with the gateway device over the internet or a cellular network when the remote device is not within the second threshold distance of the gateway device. In various embodiments, the remote device and the gateway device exchange digital certificates and signatures using public key exchange to derive a shared secret to authenticate each other.

The remote device may be located outside a wireless range of the embedded device. The remote device receives status information of the embedded device and sends commands to the embedded device over a secure communication channel between the remote device and the embedded device via the gateway device. In various embodiments, the processor of the embedded device is configured to perform various aspects related to the remote device. For instance, the processor of the embedded device may receive the commands from the remote device and may verify that the commands are received from the remote device via the gateway device over the secure communication channel.

Further interactions among the remote device, the gateway device, and the embedded device may be contemplated. For instance, in various embodiments, the remote device sends status and command execution updates of the embedded device to the gateway device which is displayed on a gateway device user interface of the gateway device. In some instances, the embedded device disconnects from the gateway device when the remote device does not exchange periodic status or keep-alive message with the embedded device over the established connection. Furthermore, the gateway device may notify the remote device and attempt to restore the connection when the connection between the gateway device and the embedded device is lost. In yet further embodiments, the remote device instructs the gateway device to disconnect from the embedded device the gateway device disconnects from the embedded device and deletes communication information of the embedded device.

A system as provided herein may include a remote device, a gateway device, and an embedded device. The remote device may include a remote network access device configured to use a long-range wireless network protocol to connect with another device. The gateway device may include aspects as well. The gateway device may include a gateway network access device configured to use the long-range wireless network protocol to connect with the remote device and a short-range wireless network protocol. The gateway device may include a gateway device processor coupled to the gateway network access device and configured to relay communications. The embedded device may be wirelessly coupled to the gateway device. The embedded device may include a memory, an embedded network access device, and an embedded device processor. The embedded network access device is configured to support peer-to-peer communication with the gateway network access device using the short-range wireless network protocol. The embedded device processor may be configured to determine that the gateway device is within a first threshold distance of the embedded device. The embedded device processor may be configured to establish a connection with the remote device via the gateway device using the short-range wireless network protocol and the long-range wireless network protocol.

A system as provided herein may include a gateway device and an embedded device. The gateway device may include a memory. The memory may be configured to store an application to relay communications. The gateway device may include a gateway network access device. The gateway device may include a gateway device user interface configured to display status information. The gateway device may include a gateway device processor coupled to the gateway network access device and the gateway device user interface. The gateway device processor may relay communications and may display the status information. The embedded device may be wirelessly coupled to the gateway device. The embedded device may include a memory. The embedded device may include an embedded network access device configured to support peer-to-peer communication with the gateway network access device. The embedded device may include an embedded device processor. The embedded device processor may be operable to determine that the gateway device is in a first threshold distance of the embedded device. The embedded device processor may be operable to establish a connection with a remote device via the gateway device.

The gateway network access device may have further aspects. For example, the gateway network access device may include an internet-connectable device connectable to a remote device. The embedded network access device may include a peer-to-peer connectable device connectable to the gateway device. In various embodiments, the first threshold distance may include a communication range of the embedded network access device and the gateway device via the peer-to-peer communication.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

As disclosed herein, systems, apparatuses, and methods for remote control of internet-of-things (IoT) devices are provided.

IoT systems often include remote control capabilities for IoT devices. IoT systems often comprise an IoT device, a local controller, and a remote controller. In some cases, one controller has command authority to issue instructions to the IoT device and another controller does not have command authority to issue instructions but does have authority to view and display data from the IoT device. In various scenarios, a challenge arises when a view-only controller has a communication link to the IoT device, but the command controller does not have a communication link to the IoT device.

One example of a remote-control use case is when a controller device, such as a dedicated device or a smartphone application, is outside of direct wireless proximity range of the IoT device but is desired to issue commands to the IoT device. In another example, a server that provides user control of an IoT device through a user interface (e.g., a portal) or runs a program that controls the IoT device but is outside of direct wireless proximity range of the IoT device. Similarly, the server is desired to issue commands to the IoT device but lacks a direct wireless communication link to the IoT device.

Typical remote controllers may connect to an IoT device over a local network or an internet connection. However, further challenges arise with battery-powered IoT devices which may lack internet connectivity and/or may not support Wi-Fi, LTE, or other long-range communication mechanisms. In various instances, battery-powered IoT devices may be limited to short-range communication mechanisms, such as Bluetooth Low Energy (BLE) or other mechanisms.

Figure 1A:
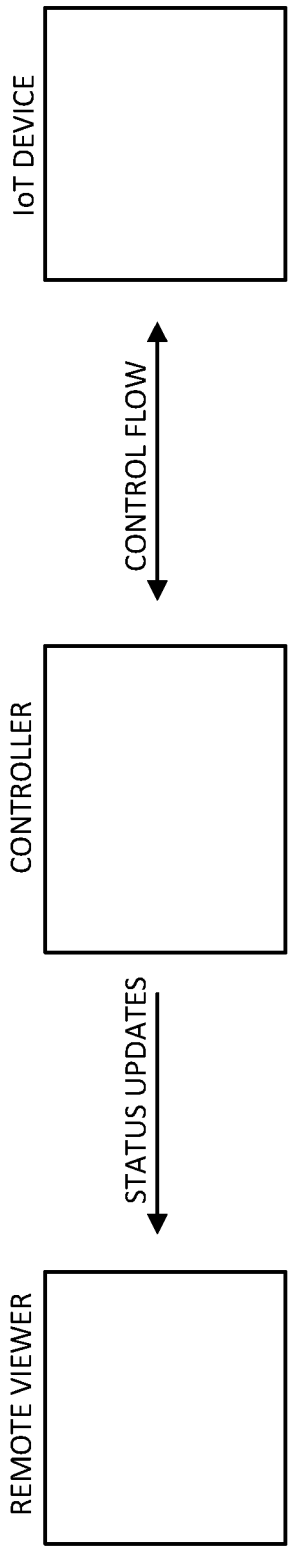
FIG. 1A depicts a prior art system for controlling an IoT device.

FIG. 1A depicts a prior art system for controlling an IoT device. A controller must be within direct communication range of an IoT device. The controller issues control instructions (e.g., "control flow"). The controller must also be in communication with a network such as the internet to provide status updates to a remote viewer, which may be disposed outside of the direct communication range of the IoT device. The controller and the IoT device may communicate directly by a peer-to-peer communication technology such as Bluetooth Low Energy. The controller may send status information to remote viewers over the internet. In one scenario, a wireless insulin pump is directly connected to a smartphone controller application over a peer-to-peer communication technology. The smartphone controller application controls the wireless insulin pump. The smartphone controller application sends status updates to a remote viewer.

However, there are cases where the smartphone having the controller application is not in proximity to the IoT device. For instance, a child may be wearing an insulin pump and have a view-only application on the child's smartphone that allows the child to view a blood glucose level or an insulin dosage, but that does not allow the child to adjust insulin administration. Meanwhile, a parent or school nurse may have a smartphone controller application on their smartphone which does permit adjustment of insulin administration. The parent or school nurse will frequently be too far away from the child to instantiate a communication link between their smartphone controller app and the insulin pump due to the limited range of peer-to-peer communication technologies such as Bluetooth Low Energy.

To address this limitation, a system and method for remote control of IoT devices may permit control of medical or other types of IoT devices remotely using another application on another smartphone that is within wireless range of the device as a gateway. Furthermore, the remote controller does not need to be a smartphone application but may be a server portal which provides control functionality.

Figure 1B:
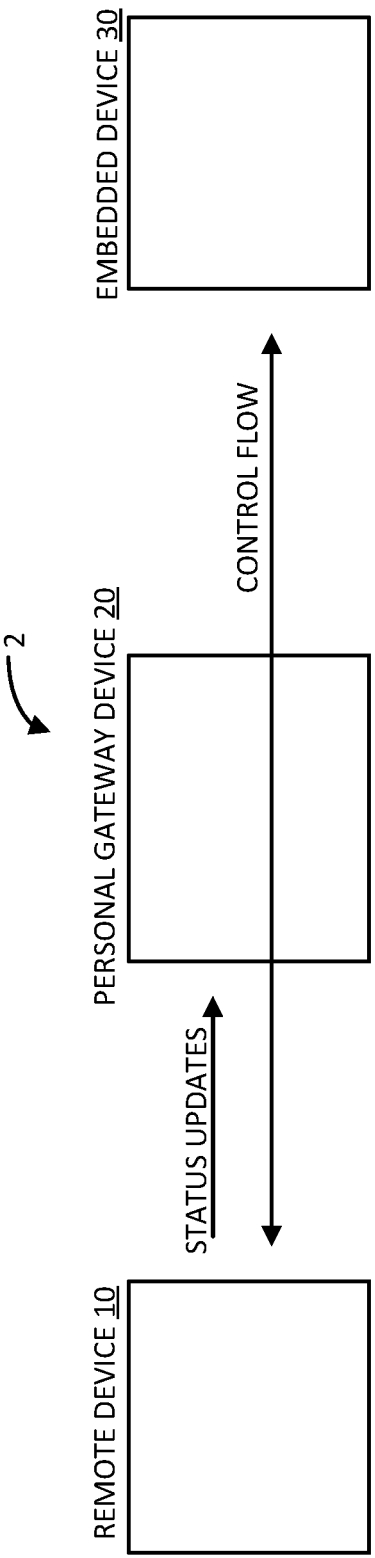
FIG. 1B illustrates a scenario where instructions are issued to an embedded device by a remote device outside of a communication range of the embedded device, according to various embodiments.

FIG. 1B illustrates a novel scenario wherein instructions are issued by a remote device 10 disposed outside of the direct communication range of the IoT device (embedded device 30) and relayed to the IoT device by a view-only controller (gateway device 20). The remote device 10 then provides status updates to the gateway device 20 which may be viewed on a gateway device user interface 29 of the gateway device 20.

Thus, an application 28 on a gateway device 20 such as a smartphone that is within direct communication range of the embedded device 30 may provide connectivity between the embedded device 30 and a remote device 10 serving as the controller of the embedded device 30. The application 28 on the gateway device 20 may provide connectivity even when not in a foreground or when the smartphone is locked. Furthermore, the application 28 may be feature-limited, not having authority to issue commands to the embedded device 30 from the gateway device 20 but serving as a viewer or gateway.

Figure 2:
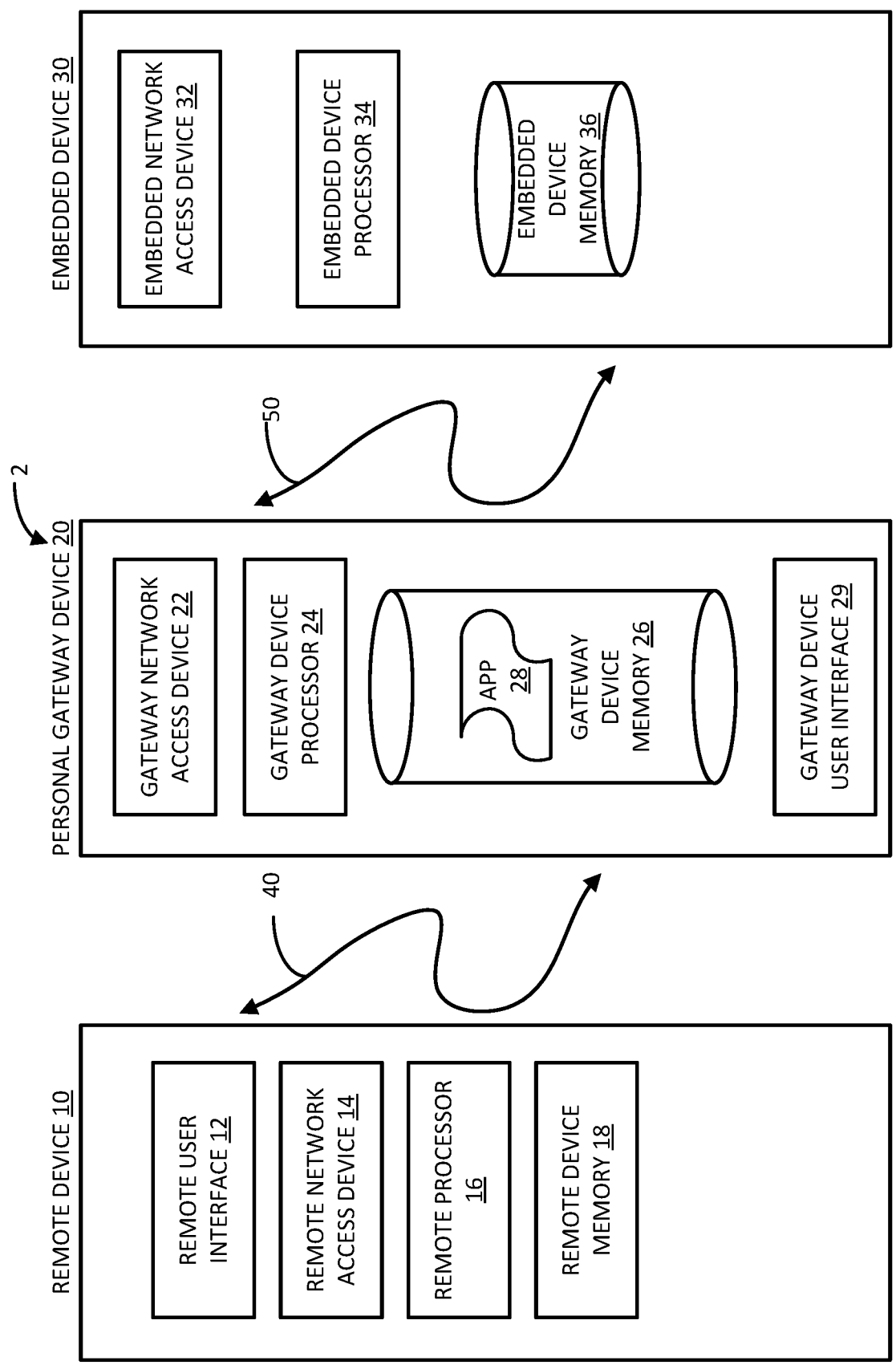
FIG. 2 depicts a system for remote control of the embedded device, according to various embodiments.

The system 2 for remote control of IoT devices may have various architectures. With reference to FIG. 2, an example system for remote control of IoT devices 2 is provided. The system 2 may include a remote device 10, a gateway device 20, and an embedded device 30. The remote device 10 and the gateway device 20 may be connected by a first communication channel 40. The gateway device 20 and the embedded device 30 may be connected by a second communication channel 50. In this manner, the remote device 10 may issue commands to the embedded device 30, which are transmitted over the first communication channel 40 to the gateway device 20. The remote device 10 may transmit data for viewing on the gateway device 20 as well. The gateway device 20 may then pass those commands to the embedded device 30 via the second communication channel 50 or display the data for viewing.

Turning more specifically to aspects of the remote device 10, the remote device 10 may be a personal device, such as a smartphone. The remote device 10 may be a server such as a cloud server. The remote device 10 may comprise a smartphone and/or a smartphone application having authority to issue commands to an IoT device, such as embedded device 30. The remote device 10 may comprise a server having authority to issue commands to the IoT device, such as the embedded device 30. The server may have a program operable to issue commands or may provide a gateway device user interface 29 to permit a remote user to issue commands. For example, remote device 10 may include a remote user interface 12. The remote user interface 12 may be a browser session, or may be a dedicated software application, or may be a special purpose hardware device.

The remote device 10 may also include a remote network access device 14. The remote network access device 14 comprises a transceiver operable to communicate over the first communication channel 40. For instance, the remote network access device 14 may be a transceiver operable to communication over the internet, or a cellular network, or a Wi-Fi link, or an RF link such as a microwave network, or any medium as desired. As such, the first communication channel 40 may be the internet, or a cellular network, or a Wi-Fi link, or an RF link such as a microwave network or any medium as desired.

The remote device 10 may also include a remote processor 16. The remote processor 16 is a computer processor configured to receive, manipulate, and transmit data. The remote processor 16 may be a microcontroller, a field-programmable gate array, a single-board computer, a conventional personal computer processor, or any other processor as desired.

The remote device 10 may include a remote device memory 18. The remote device memory 18 may be an electronic memory to store data. The remote device memory 18 may be a persistent memory, meaning that stored data is retained when power is turned off. The remote device memory 18 may be a non-persistent memory, meaning that stored data is erased when power is turned off.

The remote device 10 may be a personal device that has a memory that stores a mobile application or a cloud server that stores a cloud controller application. The remote device 10 directly connects with the gateway device 20 when the remote device 10 is within a second threshold distance of the gateway device 20 and connects with the gateway device 20 over the internet or a cellular network when the remote device 10 is not within the second threshold distance of the gateway device 20. Thus, one may appreciate that the remote device 10 may be a same device as a gateway device 20 but operating with different software operating thereon.

The gateway device 20 also may have various additional aspects. The gateway device 20 may be in proximity to the embedded device 30 that is not capable of communicating via the first communication channel 40. The gateway device 20 comprises a device that can communicate over the first communication channel 40 to the remote device 10 and that can also communicate over a second communication channel 50 to the embedded device 30. For instance, the gateway device 20 may comprise a smartphone within a peer-to-peer communication range of the embedded device 30 and having a cellular or Wi-Fi connection to the internet which permits communication with the remote device 10. In various embodiments, the gateway device 20 and the remote device 10 may be a same device differently configured.

The gateway device 20 may have a gateway network access device 22. The gateway network access device 22 comprises a transceiver operable to communicate over the internet, or a cellular network, or a Wi-Fi link, or an RF link such as a microwave network, or any medium as desired. As such, the gateway network access device 22 connects the gateway device 20 to the first communication channel 40. The gateway network access device 22 further comprises a transceiver operable to communicate over a peer-to-peer communication protocol. The gateway network access device 22 may also include a peer-to-peer communication transceiver, such as a Bluetooth transceiver, a Bluetooth Low Energy transceiver, a ZigBee transceiver, or another transceiver as desired. As such, the gateway network access device 22 connects the gateway device 20 to the second communication channel 50. Thus, one may appreciate that the gateway network access device 22 may include two transceivers and/or a transceiver operable to communicate using two different protocols. For instance, the gateway network access device 22 may use a first network protocol and a second network protocol.

The gateway device 20 may also include a gateway device processor 24. The gateway device processor 24 is a computer processor configured to receive, manipulate, and transmit data. The gateway device processor 24 may be a microcontroller, a field-programmable gate array, a single-board computer, a conventional personal computer processor, or any other processor as desired.

The gateway device 20 may include a gateway device memory 26. The gateway device memory 26 may be an electronic memory to store data. The gateway device memory 26 may be a persistent memory, meaning that stored data is retained when power is turned off. The gateway device memory 26 may be a non-persistent memory, meaning that stored data is erased when power is turned off.

The gateway device memory 26 may store an application 28. The application 28 comprises software that facilitates the transmission of commands received over the first communication channel 40 from the remote device 10 to the embedded device 30 via a second communication channel 50. The application 28 further facilitates display of status information and other view-only output received via the first communication channel 40 from the remote device 10 or via the second communication channel 50 from the embedded device 30 on a gateway device user interface 29. The gateway device user interface 29 may be a visual screen, a speaker, a haptic feedback device, a braille device, or any other human-machine interface.

Finally, the system 2 may include the embedded device 30. The embedded device 30 is an electronic device that is controlled by a different electronic device. For instance, an embedded device 30 may be controlled by the remote device 10. An embedded device 30 may be a medical device, a smart home device, an automation device, an industrial device, or any other electronic device subject to control by other electronic devices such as a remote device 10. One or more embedded device 30 may be a PLC device, a SCADA device, or any other device operable to receive commands form other electronic devices. In a nonlimiting example, the embedded device 30 is an insulin pump.

The embedded device 30 may include an embedded network access device 32. The embedded network access device 32 comprises a transceiver operable to communicate over the second communication channel 50. Thus, the transceiver may be a peer-to-peer communication transceiver, such as a Bluetooth transceiver, a Bluetooth Low Energy transceiver, a ZigBee transceiver, or another transceiver as desired.

The embedded device 30 may include an embedded device processor 34. The embedded device processor 34 is a computer processor configured to receive, manipulate, and transmit data. The embedded device processor 34 may be a microcontroller, a field-programmable gate array, a single-board computer, a conventional personal computer processor, or any other processor as desired.

The embedded device 30 may include an embedded device memory 36. The embedded device memory 36 may be an electronic memory to store data. The embedded device memory 36 may be a persistent memory, meaning that stored data is retained when power is turned off. The embedded device memory 36 may be a non-persistent memory, meaning that stored data is erased when power is turned off.

Figure 3:
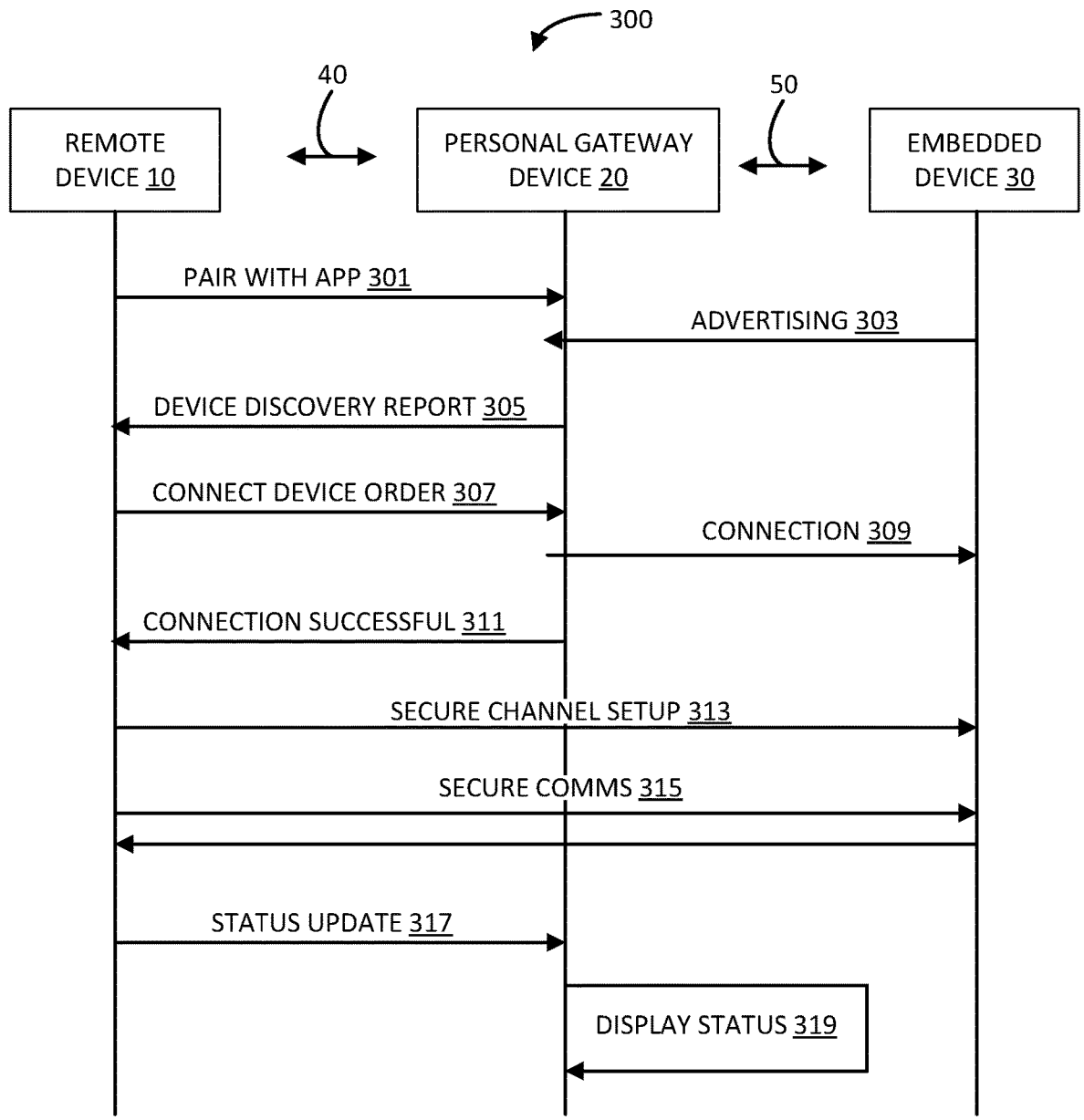
FIG. 3 shows a method of communication link instantiation for remote control of the embedded device, according to various embodiments.

Having discussed the general architecture of a system for remote control of IoT devices 2, as well as detailed aspects of the remote device 10, the gateway device 20 and the embedded device 30, attention is now directed to FIG. 3, with periodic reference to aspects of FIG. 2. FIG. 3 provides an example method of communication link instantiation 300 for the system 2. For instance, a remote device 10 may pair with an application 28 on a gateway device 20 (block 301). This pairing process may include authentication and login steps. The remote device 10 may communication over a first communication channel 40 to connect with the application 28. The embedded device 30 may advertise its presence (block 303) over the second communication channel 50 to the gateway device 20. The application 28 running on the gateway device 20 may then cause the gateway device 20 to provide a device discovery report to the remote device 10 (block 305). The device discovery report includes data identifying the embedded device 30 detected in response to advertising by the embedded device 30 of its presence.

The remote device 10 may return, via the first communication channel 40, an order to the gateway device 20 ordering the gateway device 20 to connect with one or more embedded device 30 (block 307). For instance, a user operating the remote device 10 may select a desired embedded device 30 from the device discovery report and reject undesired embedded devices from the device discovery report. The user may provide a command to connect to the desired embedded device 30 so that the remote device 10 may control the embedded device 30. However, a link between the embedded device 30 and the remote device 10 may be impossible due to system configuration, distance, communication media, etc. For instance, the embedded device 30 may be capable only of short range peer-to-peer communication and not direct connection to the internet or another network. In response to the connection order (block 307), the gateway device 20 may then connect to the embedded device 30 via the second communication channel 50 (block 309). Upon successful connection, the gateway device 20 then may report to the remote device 10 via the first communication channel 40 that a connection was successful (block 311).

Consequently, the gateway device 20 is connected to the remote device 10 by the first communication channel 40 and the gateway device 20 is also connected to the embedded device 30 by the second communication channel 50. Because the gateway device 20 is connected to both the remote device 10 and also to the embedded device 30, the gateway device 20 may facilitate communication between the remote device 10 and the embedded device 30. In this manner, the gateway device 20 may be said to provide a communication gateway between the remote device 10 and the embedded device 30 even though the remote device 10 is unable to communicate with the embedded device 30 over the second communication channel 50 due to distance, incompatibility, lack of features, and/or non-connectability of the embedded device 30 to the internet or other network.

The remote device 10 may instantiate a secure channel setup process (block 313) with the embedded device 30. For instance, authentication, encryption, key sharing, credential comparison, or other mechanisms of providing for secure communication may be implemented and secure communication may be established between the remote device 10 and the embedded device 30 via the gateway device 20 (block 315). Notably, in various instances, the gateway device 20 has lesser privileges than the remote device 10. For instance, the gateway device 20 may pass commands from the remote device 10 to the embedded device 30 but may lack authority to issue its own commands to the embedded device 30.

Of further note, the remote device 10 may provide status updates to the gateway device 20 (block 317). For instance, the remote device 10 may transmit data to the gateway device 20 that indicates whether commands were executed successfully by the embedded device 30 or may transmit data that reflects values of variables measured by the gateway device 20. The gateway device 20 may display the status updates for human viewing (block 319). For example, the remote device 10 may transmit data to the gateway device 20 indicating an amount of insulin administered, a blood glucose measurement, a battery status, an insulin reservoir status, and/or other status updates as desired.

Figure 4:
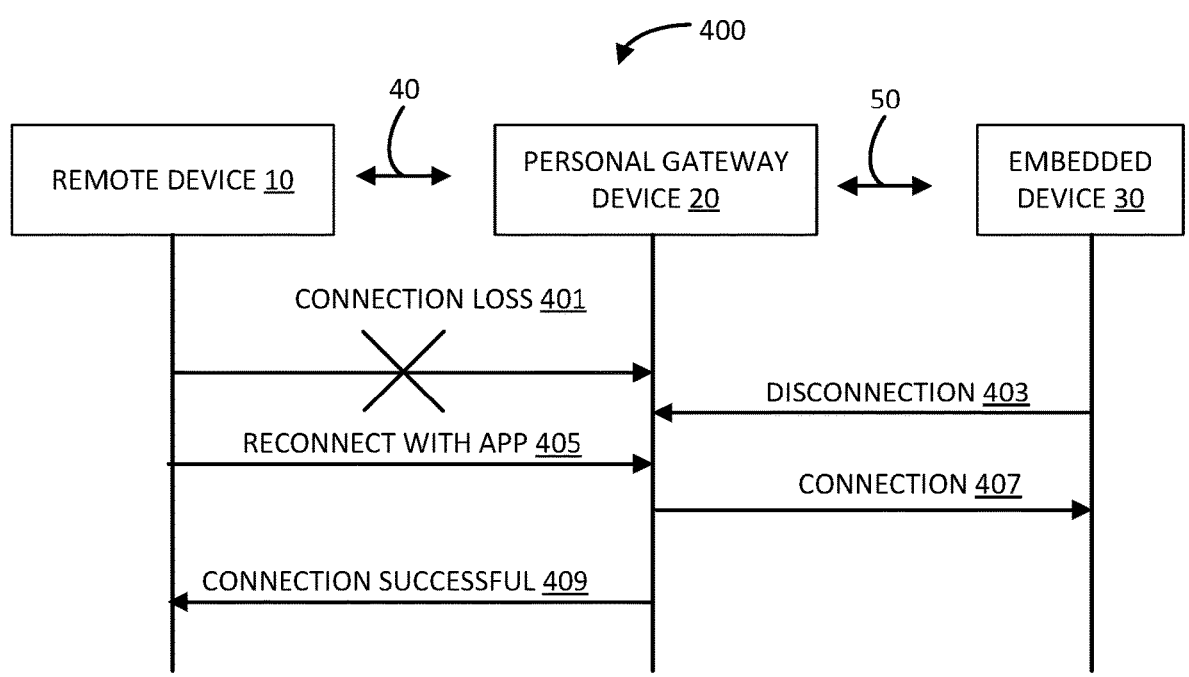
FIGS. 4 and 5 provide example methods of communication link reestablishment to reestablish communication between the remote device and the embedded device, according to various embodiments.

FIG. 4 provides an example method of communication link reestablishment 400 for the system 2 to reestablish communication between the remote device 10 and the embedded device 30. For example, connectivity over the first communication channel 40 between the remote device 10 and gateway device 20 may be lost (block 401). Upon loss of communication over the first communication channel 40 between the remote device 10 and the gateway device 20, the embedded device 30 may detect the disappearance of a communication link to the remote device 10 and may disconnect from the gateway device 20 (block 403). In this manner, the embedded device 30 may connect or disconnect from the gateway device 20 consistent with the presence or absence of connectivity to the remote device 10. Such responsive connectivity facilitates enhanced security, particularly in implementations where the gateway device 20 has lesser privileges than the remote device 10. This connection loss may be detected by detecting of a failure to successfully exchange data over a first duration of time. This connection loss may be detected by detecting of a failure to successfully exchange specific data packets corresponding to a presence indication. This connection loss may be detected by detecting of a failure of received data to conform to expected features such as check-sum, periodicity, source or destination address, signal-to-noise ratio (SNR) or other features as desired.

The remote device 10 may instantiate a reconnection attempt with the application 28 on the gateway device 20 over the first communication channel 40 (block 405). Upon successful reconnection, the application 28 on the gateway device 20 may instantiate a reconnection attempt with the embedded device 30 over the second communication channel 50 (block 407). In response to successful reconnection between the gateway device 20 and the embedded device 30 over the second communication channel 50, the gateway device 20 may report to the remote device 10 via the first communication channel 40 that the reconnection to the embedded device 30 was successful (block 409). Subsequently, communication may resume with blocks 313, 315, 317, and 319 (FIG. 3).

Figure 5:
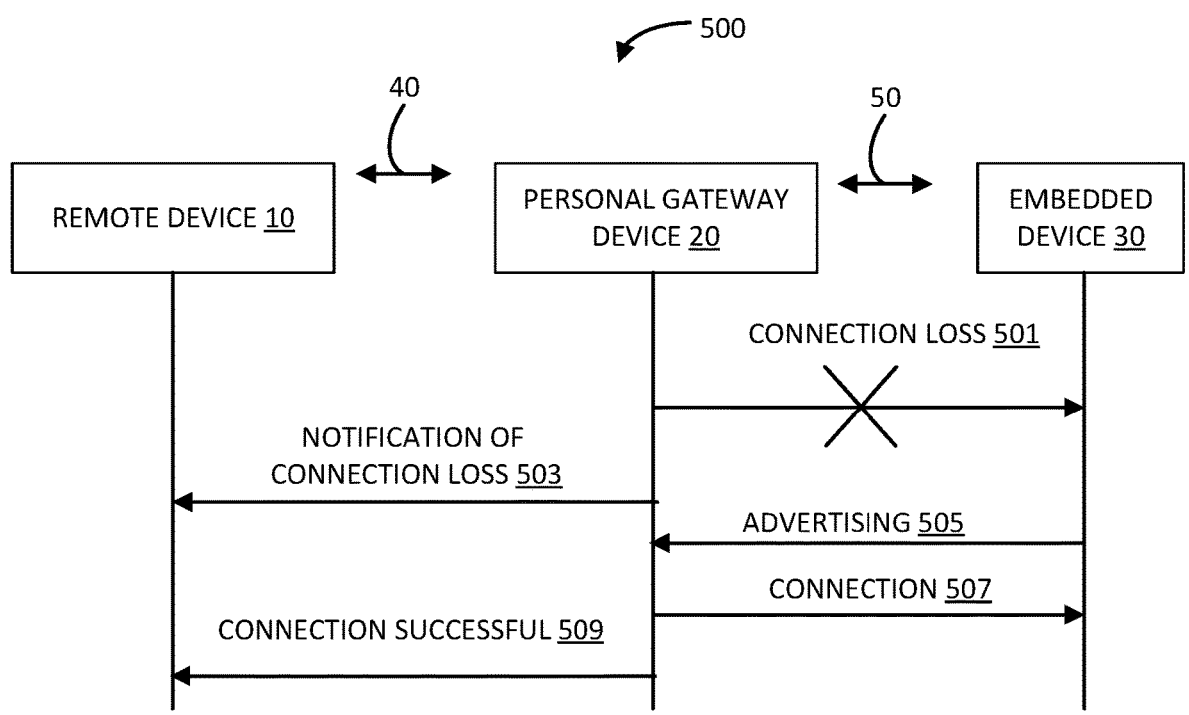

FIG. 5 provides an example method of communication link reestablishment 500 for the system 2 to reestablish communication between the remote device 10 and the embedded device 30. For example, connectivity over the second communication channel 50 between the embedded device 30 and gateway device 20 may be lost (block 501). Upon loss of communication over the second communication channel 50 between the embedded device 30 and the gateway device 20, the gateway device 20 may detect the disappearance of a communication link over the second communication channel 50 to the embedded device 30 and may notify the remote device 10 of the connection loss (block 503). The embedded device 30 may also detect the disappearance of a communication link over the second communication channel 50 and the embedded device 30 may advertise its presence (block 505) over the second communication channel 50 to the gateway device 20. The application 28 running on the gateway device 20 may then cause the gateway device 20 to instantiate a reconnection attempt with the embedded device 30 over the second communication channel 50 (block 507). In response to successful reconnection between the gateway device 20 and the embedded device 30 over the second communication channel 50, the gateway device 20 may report to the remote device 10 via the first communication channel 40 that the reconnection to the embedded device 30 was successful (block 509). Subsequently, communication may resume with blocks 313, 315, 317, and 319 (FIG. 3).

Figure 6:
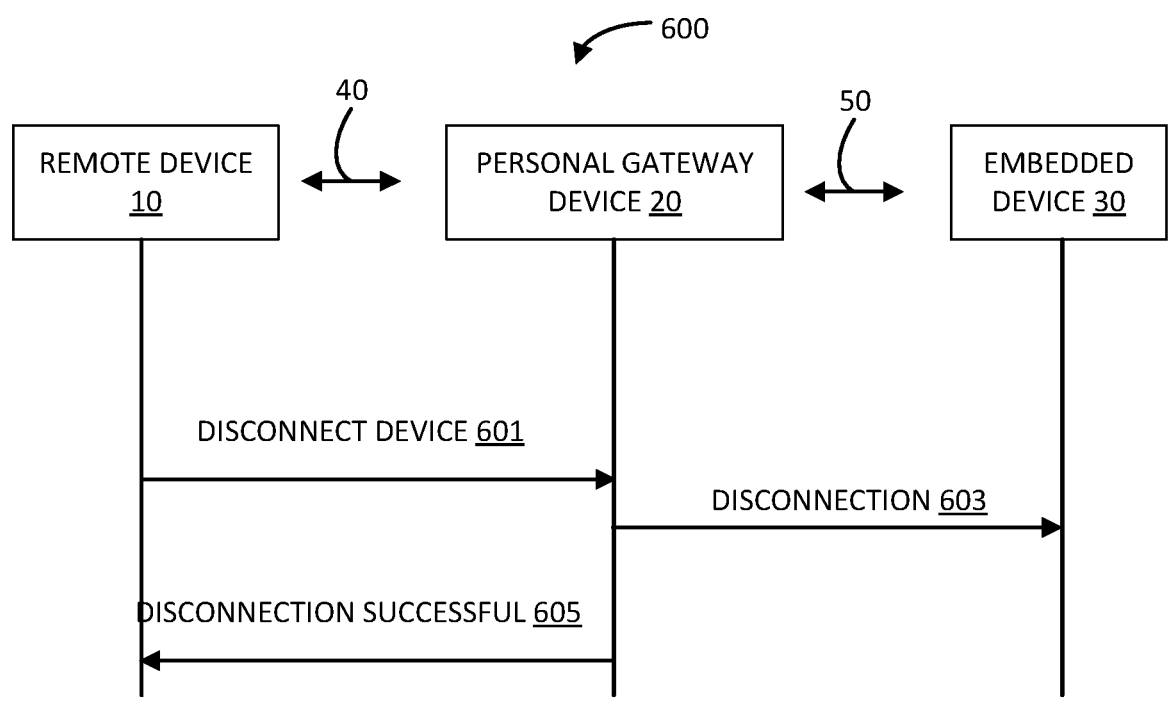
FIG. 6 depicts a method of communication link dissolution to disconnect the embedded device, according to various embodiments.

FIG. 6 provides an example method of communication link dissolution 600 for the system 2 to disconnect an embedded device 30. For instance, the remote device 10 may transmit a command instructing the disconnection of the embedded device 30. The remote device 10 may transmit the disconnection command over the first communication channel 40 to the gateway device 20 (block 601). The application 28 on the gateway device 20 may disconnect from the embedded device 30 over the second communication channel 50 (block 603). In response to successful disconnection between the gateway device 20 and the embedded device 30 over the second communication channel 50, the gateway device 20 may report to the remote device 10 via the first communication channel 40 that the disconnection of the embedded device 30 was successful (block 605).

Figure 7:
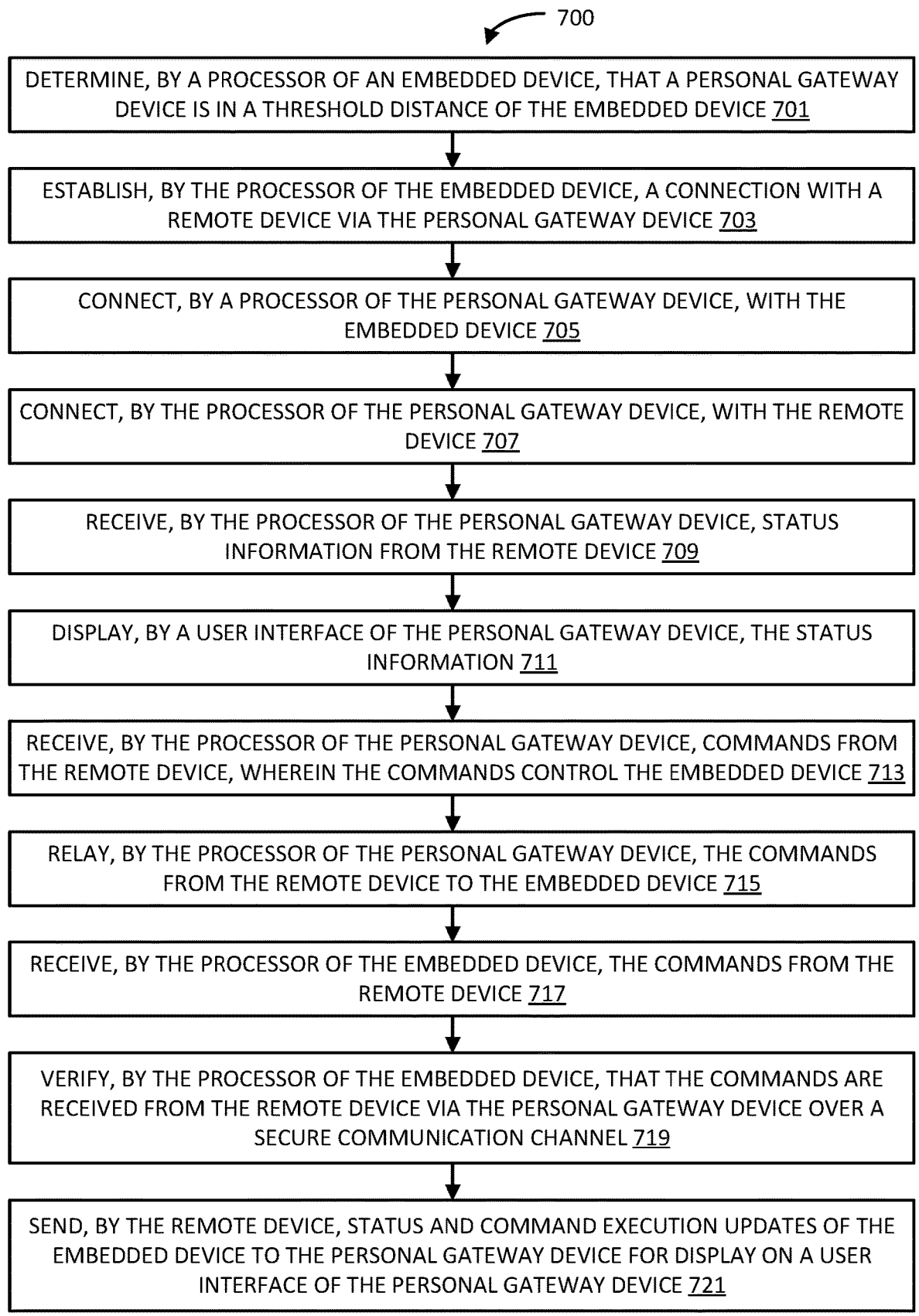
FIG. 7 illustrates a method of remote control of the embedded device, according to various embodiments.

Having discussed several scenarios involving the exchanges associated with setting up connections, performing reconnections, and performing disconnections, attention is now directed to FIGS. 2 and 7 for a discussion of a method 700 of remote control of an embedded device 30 via the systems and devices herein. For example, an embedded device processor 34 of an embedded device 30 may determine that a gateway device 20 is in a first threshold distance of the embedded device 30 (block 701). For instance, the embedded device processor 34 of the embedded device 30 may communicate via a second communication channel 50 with a gateway device 20 and determine that the embedded device 30 is within a first threshold distance. Determining that the embedded device 30 is within a first threshold distance may comprise establishing communication with the gateway device 20. For instance, the first threshold distance may be an effective communication range of the embedded device 30 and the gateway device 20 utilizing the peer-to-peer communication technology of the second communication channel 50. In various instances, the first threshold distance is defined by an effective communication range of a Bluetooth Low Energy (BLE) communication technology.

The method 700 may include establishing, by the embedded device processor 34 of the embedded device 30, a connection with a remote device 10 via the gateway device 20 (block 703). For instance, the embedded device 30 and the embedded network access device 32 of the embedded device 30 may communicate via the second communication channel 50 with the gateway device 20. The gateway device 20 may communicate via the first communication channel 40 with the remote device 10. As such, the embedded device processor 34 of the embedded device 30 may establish, in collaboration with the embedded network access device 32, the connection with the remote device 10 via the gateway device 20. The gateway device 20 facilitates a logical interconnection between the first communication channel 40 and the second communication channel 50.

Having established communication between the embedded device 30 and the remote device 10, the method 700 may include connecting, by the gateway device processor 24 of the gateway device 20, the gateway device 20 and the embedded device 30 (block 705). The method 700 also may include connecting, by the gateway device processor 24 of the gateway device 20, the gateway device 20 with the remote device 10 (block 707) so that the logical interconnection between the first communication channel 40 and the second communication channel 50 is facilitated.

Having established communication between the embedded device 30 and the remote device 10, the remote device 10 may further collect status information from the embedded device 30 and provide this status information to the gateway device 20. For instance, the embedded device 30 may provide status information to the gateway device 20 via a second communication channel 50 and the gateway device 20 provides this status information to the remote device 10 via a first communication channel 40. The gateway device 20 may lack capabilities or permission to directly decode this status information. The remote device 10 may then provide all or some of the status information to the gateway device 20. This status information may include the values of measured variables or an indication whether a command from the remote device 10 to the embedded device 30 was acted upon successfully by the embedded device 30, or any further information as desired. As such, the method 700 may proceed with receiving, by the gateway device processor 24 of the gateway device 20, status information from the remote device 10 (block 709). A gateway device user interface 29 of the gateway device 20 may then communicate the status information in a human-readable format for a human user to read. For instance, a gateway device user interface 29 of the gateway device 20 may display the status information such as on a screen (block 711).

Additionally, the remote device 10 transmit commands for the embedded device 30 to execute. The remote device 10 may provide these commands to the gateway device 20 via the first communication channel 40 and the gateway device 20 may provide these commands to the embedded device 30 by the second communication channel 50. The gateway device 20 may lack capabilities or permission to directly decode these commands. The gateway device 20 may lack capabilities or permission to transmit its own commands to the embedded device 30 for execution. The gateway device 20 may provide the commands to the embedded device 30. These commands may be an instruction to operate an actuator, sense a variable, reconfigure a device, and/or the like. Thus, the method 700 may include receiving, by the processor of the gateway device 20, commands from the remote device 10, wherein the commands control the embedded device 30 (block 713). The method 700 may include relaying, by the processor of the gateway device 20 the commands from the remote device 10 to the embedded device 30 (block 715).

The processor of the embedded device 30 may receive the commands from the remote device 10 (block 717). For instance, the embedded network access device 32 of the embedded device 30 may be in communication with the gateway device 20 via the second communication channel 50. The commands received over the second communication channel 50 from the gateway device 20 by the embedded network access device 32 may be provided to the embedded device processor 34 by the embedded network access device 32.

The processor of the embedded device 30 may verify that the commands are received from the remote device 10 via the gateway device 20 over a secure communication channel (block 719). For instance, encryption, cryptographic keys, query and response interrogation, data checksums, source and destination addresses, and other mechanisms may be employed to establish that the commands are from a correct remote device 10 and contain content that conforms to expectations.

The remote device 10 may send status updates such as information regarding a value of a variable and/or whether a command is successfully executed to the embedded device 30. The updates may be sent via the gateway device 20. Moreover, the updates may be for display on a gateway device user interface 29 of the gateway device 20. For example, the remote device 10 may receive the updates and provide all or part of the updates to the gateway device 20 (block 721).

Figure 8:
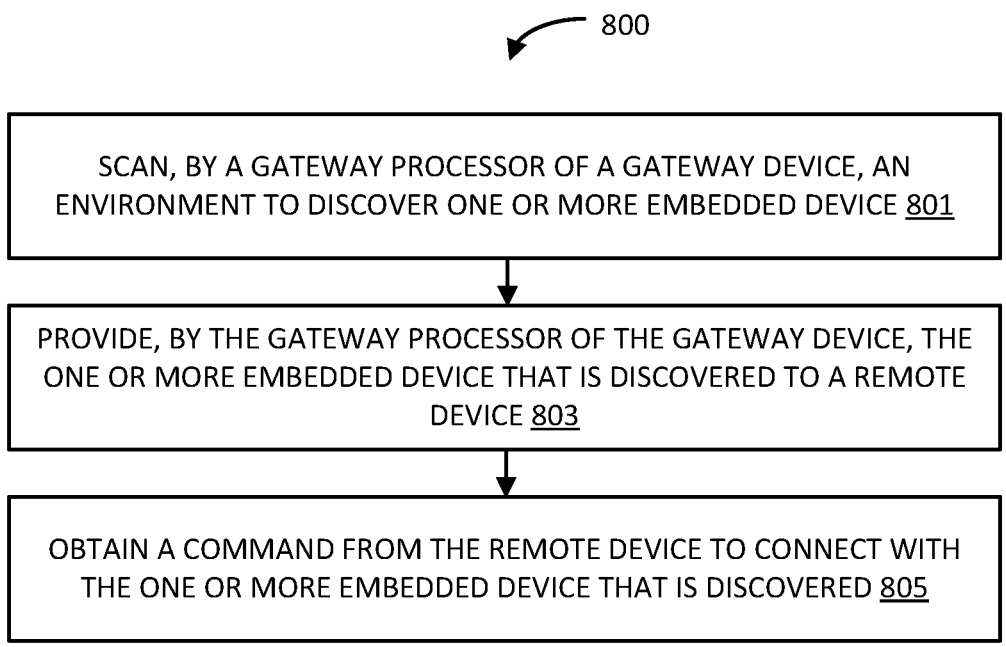
FIG. 8 shows a method of instantiating a control relationship between the remote device and the embedded device, according to various embodiments.

In various embodiments, a preexisting relationship among the remote device 10, the gateway device 20, and the embedded device 30 may not exist. As such, there may be implemented a method for discovering, connecting to, and controlling, an embedded device 30. Turning attention to a combination of FIG. 2 and FIG. 8, a method of instantiating a control relationship 800 is provided. The method may include scanning, by a gateway device processor 24 of a gateway device 20, an environment to discover one or more embedded device 30 (block 801). For example, a gateway device 20 may transmit queries on a second communication channel 50 and listen for responses from one or more embedded device 30. Moreover, a gateway device 20 may listen for queries from one or more embedded device 30 on the second communication channel 50. The gateway device 20 may discover a presence of the one or more embedded device 30 within communication range of the gateway device 20.

The gateway device processor 24 of the gateway device 20 may provide the one or more embedded device 30 that is discovered to the remote device 10 (block 803). For example, the gateway device 20 may create a list of identifiers corresponding to the discovered one or more embedded device 30. The gateway device 20 may transmit this list over the first communication channel 40 to the remote device 10.

The gateway device 20 may obtain a command from the remote device 10 to connect with the one or more embedded devices that is discovered (block 805). For instance, the remote device 10 may determine a desired embedded device 30 from among the list of identifiers and instruct the gateway device 20 to connect via the second communication channel 50 with that embedded device 30.

Mechanisms may also be implemented to identify a user operating a gateway device 20 and/or a remote device 10. For instance, security concerns may require that gateway devices and remote devices are not allowed to interconnect unless under shared control. For instance, a remote device 10 may be a computer browser session operated by a wearer of an insulin pump to control the insulin pump. The gateway device 20 may be a device utilized by the wearer of the insulin pump to view data relating to blood glucose levels, insulin administration, and the like. Similarly, shared control may refer to control by different individuals but with common credentials or some other relationship. For instance, the remote device 10 may be a computer browser session operated by a parent of a child wearing an insulin pump and operated to control the insulin pump. The gateway device 20 may be a device utilized by the child wearing the insulin pump. One may desire to verify that the browser session and the gateway device 20 are only interconnected with permission from an authorizing party, such as a parent.

Figure 9:
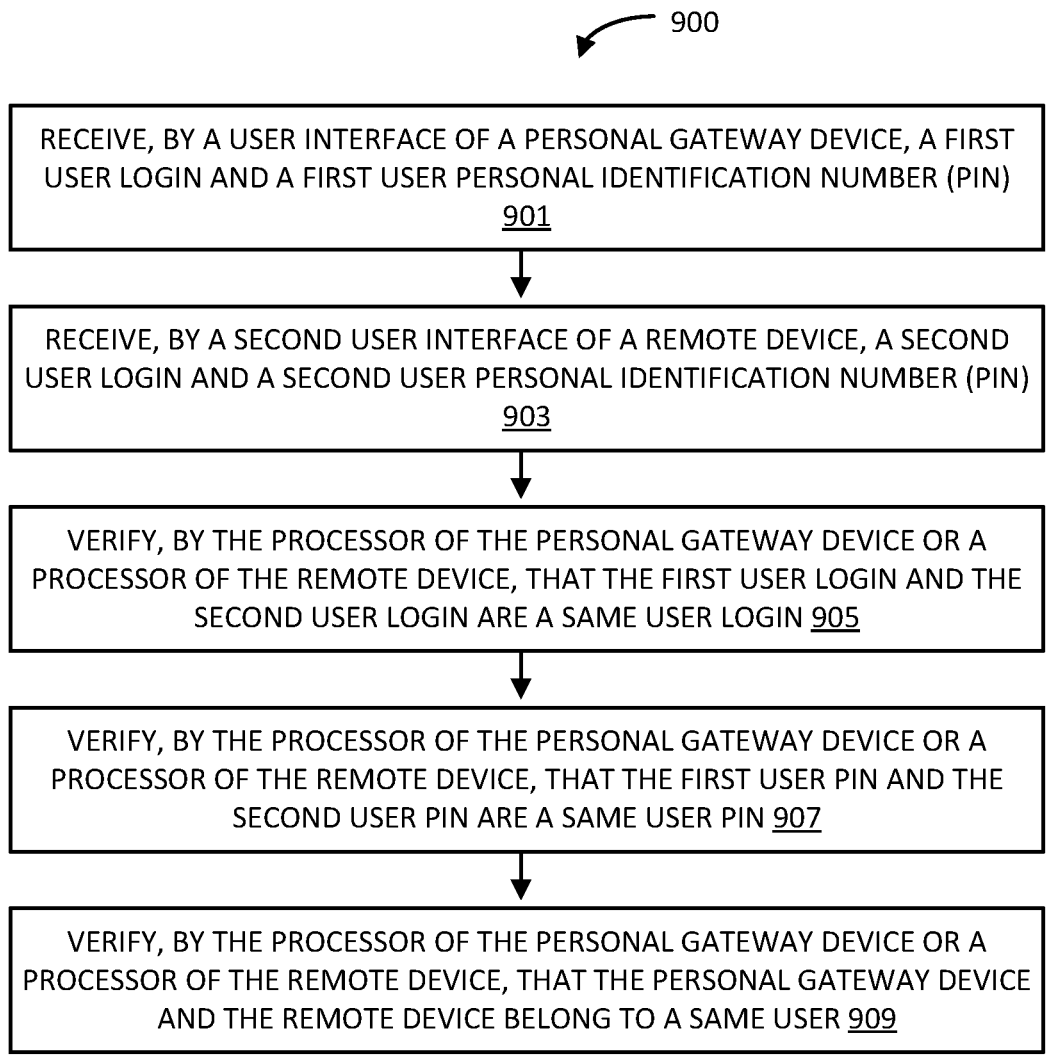
FIG. 9 provides a method of identity verification, according to various embodiments.

Thus, with reference to FIG. 2 and FIG. 9, a method of identity verification 900 is provided. The method may include receiving by a gateway device user interface 29 of a gateway device 20, a first user login and a first user personal identification number (PIN) (block 901). The first user login may be a unique identifier of a user. The first user PIN may be a secret known or possessed by the user or another authorized individual. The method may include receiving, by a remote user interface 12 of a remote device 10, a second user login and a second user PIN (block 903). The processor of the gateway device 20 or the processor of the remote device 10 may verify that the first user login and the second user login are a same user login (block 905). Similarly, the processor of the gateway device 20 or the processor of the remote device 10 may verify that the first user PIN and the second user PIN are a same user PIN (block 907). As such, the processor of the gateway device 20 or the processor of the remote device 10, may, by verifying matches between both the username and the user PIN, verify that the gateway device 20 and the remote device 10 belong to a same user (block 909).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for remote control of an embedded device, the system comprising:
    a gateway device including:
        a gateway network access device configured to use a first network protocol and a second network protocol; and
        a gateway device processor coupled to the gateway network access device and configured to relay communications;
    the embedded device wirelessly coupled to the gateway device and including:
        an embedded device memory;
        an embedded network access device configured to support peer-to-peer communication with the gateway network access device using the first network protocol; and
        an embedded device processor configured to:
            determine that the gateway device is in a first threshold distance of the embedded device;
            establish a connection with a remote device via the gateway device using the first network protocol and the second network protocol; and
            disconnect from the gateway device when the remote device does not establish a secure communication channel within a predefined period with the gateway device.

2. The system of claim 1,
    wherein the gateway device has a gateway device memory that is configured to store an application that facilitates the connection between the remote device and the embedded device, and
    wherein the gateway device processor executes the application even when (i) the application operates in a background environment of the gateway device or (ii) the gateway device is in a locked state.

3. The system of claim 2,
    wherein the gateway device includes a gateway device user interface, and
    wherein the gateway device processor is configured to:
        receive status information from the remote device;
        receive commands from the remote device that control the embedded device;
        display the status information on to the gateway device user interface; and
        relay the commands from the remote device to the embedded device.

4. The system of claim 3,
    wherein the gateway device user interface of the gateway device is configured to receive a user login and a user personal identification number (PIN),
    wherein the remote device includes a remote user interface and is configured to receive a second user login and a second user PIN,
    wherein the processor of the gateway device or a processor of the remote device verifies that the user login is the same as the second user login and the user PIN is the same as the second user PIN, and
    wherein the processor of the gateway device or the processor of the remote device determines that the gateway device and the remote device belong to a same user.

5. The system of claim 1,
wherein the gateway device processor of the gateway device is configured to connect with the embedded device using the first network protocol and connect with the remote device using the second network protocol, and
wherein the first network protocol is a short-range wireless network protocol and the second network protocol is a long-range wireless network protocol.

6. The system of claim 5,
wherein the short-range wireless network protocol is a Bluetooth Low Energy (BLE) protocol, and
wherein the long-range wireless network protocol is a Wi-Fi protocol or a long-term evolution (LTE) protocol.

7. The system of claim 1,
wherein the remote device is (i) a personal device that has a remote device memory that stores a mobile application or (ii) a cloud server that stores a cloud controller application,
wherein the remote device directly connects with the gateway device when the remote device is within a second threshold distance of the gateway device, and
wherein the remote device connects with the gateway device over an internet or a cellular network when the remote device is not within the second threshold distance of the gateway device.

8. The system of claim 7, wherein the remote device and the gateway device exchange digital certificates and signatures using public key exchange to derive a shared secret to authenticate each other.

9. The system of claim 1,
wherein the remote device is located outside a wireless range of the embedded device, and
wherein the remote device receives status information of the embedded device and sends commands to the embedded device over a secure communication channel between the remote device and the embedded device via the gateway device.

10. The system of claim 9, wherein the embedded device processor of the embedded device is configured to:
receive the commands from the remote device; and
verify that the commands are received from the remote device via the gateway device over the secure communication channel.

11. The system of claim 1, wherein the gateway device processor is configured to:
scan an environment to discover one or more embedded device;
provide the one or more embedded device that is discovered to the remote device; and
obtain a command from the remote device to connect with the one or more embedded device that is discovered.

12. The system of claim 1, wherein the remote device sends status and command execution updates of the embedded device to the gateway device which are displayed on a gateway device user interface of the gateway device.

13. The system of claim 1, wherein the embedded device disconnects from the gateway device when the remote device does not exchange a periodic status or keep-alive message with the embedded device over the established connection.

14. The system of claim 1, wherein the gateway device notifies the remote device and attempts to restore the connection when the connection between the gateway device and the embedded device is lost.

15. The system of claim 1, wherein when the remote device instructs the gateway device to disconnect from the embedded device, the gateway device disconnects from the embedded device and deletes communication information of the embedded device.

16. A system for remote control of an embedded device, the system comprising:
a gateway device including:
a gateway network access device configured to use a first network protocol and a second network protocol; and
a gateway device processor coupled to the gateway network access device and configured to relay communications;
the embedded device wirelessly coupled to the gateway device and including:
an embedded device memory;
an embedded network access device configured to support peer-to-peer communication with the gateway network access device using the first network protocol; and
an embedded device processor configured to:
determine that the gateway device is in a first threshold distance of the embedded device; and
establish a connection with a remote device via the gateway device using the first network protocol and the second network protocol,
wherein the embedded device disconnects from the gateway device when the remote device does not exchange a periodic status or keep-alive message with the embedded device over the established connection.

17. The system of claim 16,
wherein the gateway device has a gateway device memory that is configured to store an application that facilitates the connection between the remote device and the embedded device, and
wherein the gateway device processor executes the application even when (i) the application operates in a background environment of the gateway device or (ii) the gateway device is in a locked state.

18. The system of claim 17,
wherein the gateway device includes a gateway device user interface, and
wherein the gateway device processor is configured to:
receive status information from the remote device;
receive commands from the remote device that control the embedded device;
display the status information on to the gateway device user interface; and
relay the commands from the remote device to the embedded device.

19. The system of claim 18,
wherein the gateway device user interface of the gateway device is configured to receive a user login and a user personal identification number (PIN),
wherein the remote device includes a remote user interface and is configured to receive a second user login and a second user PIN,
wherein the processor of the gateway device or a processor of the remote device verifies that the user login is the same as the second user login and the user PIN is the same as the second user PIN, and
wherein the processor of the gateway device or the processor of the remote device determines that the gateway device and the remote device belong to a same user.

20. The system of claim 16,
wherein the gateway device processor of the gateway device is configured to connect with the embedded device using the first network protocol and connect with the remote device using the second network protocol, and
wherein the first network protocol is a short-range wireless network protocol and the second network protocol is a long-range wireless network protocol.

21. The system of claim 20,
wherein the short-range wireless network protocol is a Bluetooth Low Energy (BLE) protocol, and
wherein the long-range wireless network protocol is a Wi-Fi protocol or a long-term evolution (LTE) protocol.

22. The system of claim 16,
wherein the remote device is (i) a personal device that has a remote device memory that stores a mobile application or (ii) a cloud server that stores a cloud controller application,
wherein the remote device directly connects with the gateway device when the remote device is within a second threshold distance of the gateway device, and
wherein the remote device connects with the gateway device over an internet or a cellular network when the remote device is not within the second threshold distance of the gateway device.

23. The system of claim 22, wherein the remote device and the gateway device exchange digital certificates and signatures using public key exchange to derive a shared secret to authenticate each other.

24. The system of claim 16, wherein the gateway device processor is configured to:
scan an environment to discover one or more embedded device;
provide the one or more embedded device that is discovered to the remote device; and
obtain a command from the remote device to connect with the one or more embedded device that is discovered.

25. The system of claim 16, wherein the embedded device processor of the embedded device disconnects from the gateway device when the remote device does not establish a secure communication channel within a predefined period with the gateway device.

26. The system of claim 16,
wherein the remote device is located outside a wireless range of the embedded device, and
wherein the remote device receives status information of the embedded device and sends commands to the embedded device over a secure communication channel between the remote device and the embedded device via the gateway device.

27. The system of claim 16, wherein the embedded device processor of the embedded device is configured to:
receive the commands from the remote device; and
verify that the commands are received from the remote device via the gateway device over the secure communication channel.

28. The system of claim 16, wherein the remote device sends status and command execution updates of the embedded device to the gateway device which are displayed on a gateway device user interface of the gateway device.

29. The system of claim 16, wherein the gateway device notifies the remote device and attempts to restore the connection when the connection between the gateway device and the embedded device is lost.

30. The system of claim 16, wherein when the remote device instructs the gateway device to disconnect from the embedded device, the gateway device disconnects from the embedded device and deletes communication information of the embedded device.

* * * * *